United States Patent
Fujikawa

(10) Patent No.: US 12,112,004 B2
(45) Date of Patent: Oct. 8, 2024

(54) ACTIVE MATRIX SUBSTRATE, DISPLAY PANEL, AND DISPLAY DEVICE

(71) Applicant: Sharp Display Technology Corporation, Kameyama (JP)

(72) Inventor: Yohsuke Fujikawa, Kameyama (JP)

(73) Assignee: Sharp Display Technology Corporation, Mie (JP)

( * ) Notice: Subject to any disclaimer, the term of this patent is extended or adjusted under 35 U.S.C. 154(b) by 0 days.

(21) Appl. No.: 17/972,490

(22) Filed: Oct. 24, 2022

(65) Prior Publication Data

US 2023/0132110 A1 Apr. 27, 2023

(30) Foreign Application Priority Data

Oct. 26, 2021 (JP) .................. 2021-175058

(51) Int. Cl.
  G06F 3/041 (2006.01)
  G02F 1/1333 (2006.01)
  G02F 1/1362 (2006.01)
  G02F 1/1368 (2006.01)
  G06F 3/044 (2006.01)

(52) U.S. Cl.
  CPC ...... *G06F 3/0443* (2019.05); *G02F 1/136204* (2013.01); *G02F 1/136286* (2013.01); *G02F 1/1368* (2013.01)

(58) Field of Classification Search
  None
  See application file for complete search history.

(56) References Cited

U.S. PATENT DOCUMENTS

| | | | |
|---|---|---|---|
| 2013/0335376 A1* | 12/2013 | Lee | G06F 3/0446 345/174 |
| 2014/0240279 A1 | 8/2014 | Hwang et al. | |
| 2014/0333572 A1* | 11/2014 | Hu | G06F 3/0412 345/174 |
| 2015/0084912 A1 | 3/2015 | Seo et al. | |
| 2015/0185938 A1* | 7/2015 | Han | G06F 3/0445 345/173 |
| 2016/0071884 A1 | 3/2016 | Miyamoto et al. | |
| 2018/0120992 A1* | 5/2018 | Lee | G06F 3/047 |

FOREIGN PATENT DOCUMENTS

| | | | | |
|---|---|---|---|---|
| CN | 104679369 B | * | 8/2019 | ......... G06F 1/1643 |
| JP | 2007-017478 A | | 1/2007 | |
| JP | 2014-164752 A | | 9/2014 | |
| JP | 2015-064854 A | | 4/2015 | |
| JP | 2016-057344 A | | 4/2016 | |
| WO | WO-2022110151 A1 | * | 6/2022 | ......... G02F 1/13338 |

* cited by examiner

*Primary Examiner* — Duane N Taylor, Jr.
(74) *Attorney, Agent, or Firm* — ScienBiziP, P.C.

(57) ABSTRACT

An active matrix substrate includes a touch electrode disposed in a pixel region, a frame touch electrode disposed in a frame region, and a dummy array segment disposed in the frame region. The frame region includes a first dummy region, provided in a position adjacent to the pixel region, where the frame touch electrode is disposed and a second dummy region provided in a position opposite to the pixel region across the first dummy region. In the second dummy region, the frame touch electrode is not disposed, but the dummy array segment is disposed.

11 Claims, 12 Drawing Sheets

ACTIVE MATRIX SUBSTRATE, DISPLAY PANEL, AND DISPLAY DEVICE

BACKGROUND

1. Field

The present disclosure relates to an active matrix substrate, a display panel, and a display device.

2. Description of the Related Art

In recent years, display panels for use in liquid crystal display devices have been put into practical use. For example, display panels including active matrix substrates have been widely used as display screens of liquid crystal display devices such as smartphones and tablet terminals. Various structures of active matrix substrates for use in these display panels have been proposed by persons skilled in the art.

For example, for the purpose of reducing defects in the process of manufacture and stabilizing the performance of an active matrix substrate, there has been proposed an active matrix substrate having a structure (hereinafter referred to as "dummy structure"), disposed in part of a frame region serving as a region surrounding a pixel region, that is similar in structure to a structure provided in the pixel region but does not fulfill a function that is similar to that of the corresponding structure provided in the pixel region. In such an active matrix substrate, typically, a plurality of rows or columns of dummy structures are disposed outside a rectangular pixel region and along each side of the pixel region. For example, in Japanese Unexamined Patent Application Publication No. 2007-17478, a dummy structure serves as a dummy pixel, and a common electrode facing a plurality of the dummy pixels is provided. The dummy pixels are arrayed at spacings that are smaller than those at which a plurality of pixels are arrayed in a pixel region. Further, this common electrode is formed so as to cover a frame region where the plurality of dummy pixels are provided and cover the pixel region.

Further, Japanese Unexamined Patent Application Publication No. 2016-57344 discloses an active matrix substrate in which a dummy structure includes a gate line and a dummy semiconductor layer intersecting the gate line and a plurality of the dummy structures are arrayed at spacing that are smaller than those at which a plurality of semiconductor layers are arrayed in a pixel region.

Further, there have been proposed an in-cell touch panel configured such that a display panel has the function of a touch panel. Such an in-cell touch panel is disclosed, for example, in Japanese Unexamined Patent Application Publication No. 2014-164752 and Japanese Unexamined Patent Application Publication No. 2015-64854. In the in-cell touch panel, a common electrode formed so as to cover a pixel region is divided into a plurality of common electrodes. Moreover, each of the divided common electrodes also serve as a touch electrode. Further, Japanese Unexamined Patent Application Publication No. 2015-64854 discloses that the touch sensitivity of an edge portion of the in-cell touch panel is improved by disposing, in a frame region that is further outward than the pixel region, a touch electrode that receives a touch input.

Note here that an active matrix substrate may suffer from entry of static electricity from the surrounding. For this reason, of a plurality of pixels arranged in a matrix in the active matrix substrate, pixels situated closer to ends of each row and each column are higher in percent defective. Accordingly, a structure is disposed in a frame region of the active matrix substrate, whereby even in the case of entry of static electricity from the surrounding, the structure is destructed to restrain the pixels from being destructed. This results in making it possible to reduce the percent defective of structures in pixels in a pixel region that is further inward than the frame region. This makes it possible to improve the yields of active matrix substrates.

Further, it is conceivable that in order to effectively detect a touch at an end of a pixel region beside a frame region in an in-cell touch panel, a structure for detecting a touch may also be disposed in the frame region.

However, in a case where both a structure for detecting a touch and a structure for reducing the percent defective of structures in the pixel region are both disposed in the frame region, the area of overlap between these structures in plan view increases. This undesirably results in a higher possibility of a short circuit occurring between the structure for detecting a touch and the structure for reducing the percent defective due to foreign matter mixed in in the process of manufacture.

It is desirable to provide an active matrix substrate, a display panel, and a display device capable of effectively detecting a touch at an end of a pixel region beside a frame region and capable of, while reducing the percent defective of structures in pixels in the pixel region, restraining a short circuit from occurring in the frame region.

SUMMARY

According to a first aspect of the disclosure, there is provided an active matrix substrate including a plurality of scanning lines, a plurality of data lines disposed to intersect the plurality of scanning lines, a plurality of switching elements disposed separately in each of a plurality of pixels demarcated by the plurality of scanning lines and the plurality of data lines, and a plurality of pixel electrode connected to the switching elements. The active matrix substrate has, in plan view, a pixel region where the plurality of pixel electrodes are provided and a frame region surrounding the pixel region. The active matrix substrate further includes a touch electrode disposed to face the plurality of pixel electrodes in the pixel region, a frame touch electrode formed at a first layer in the frame region and not electrically connected to the touch electrode, and a frame element, formed at a second layer different from the first layer in the frame region, that suppresses an electrostatic discharge failure of at least one of the plurality of pixels. The frame region includes a first region, provided in a position adjacent to the pixel region, where the frame touch electrode is disposed and a second region, provided in a position opposite to the pixel region across the first region, where the frame touch electrode is not disposed but the frame element is disposed.

According to a second aspect of the disclosure, there is provided a display panel including the active matrix substrate according to the first aspect and a counter substrate disposed to face the active matrix substrate.

According to a third aspect of the disclosure, there is provided a control circuit including the display panel according to the first aspect and a control circuit that controls the display panel.

DESCRIPTION OF THE EMBODIMENTS

Figure 1:
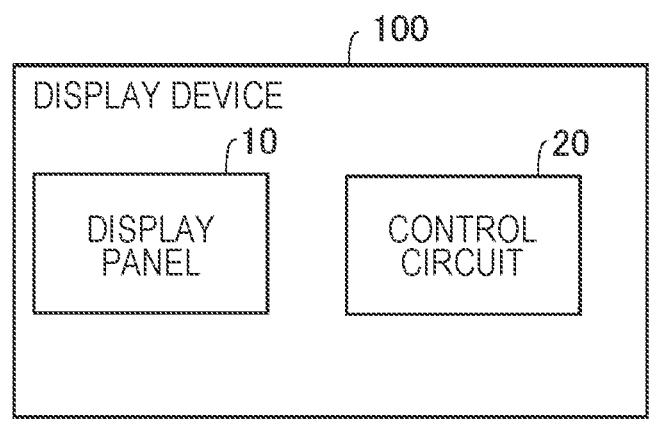
FIG. 1 is a block diagram of a display device according to a first embodiment.

The following describes embodiments of the present disclosure with reference to the drawings. It should be noted that the present disclosure is not limited to the following embodiments but is subject to design change as appropriate within the scope of fulfillment of configurations of the present disclosure. Further, in the following description, different drawings share identical signs to refer to identical components or components having similar functions, and a repeated description of such components is omitted. Further, configurations described in the embodiments and a modification may be combined or changed as appropriate without departing from the scope of the present disclosure. Further, for ease of explanation, the drawings to be referred to below illustrate configurations in a simplistic or schematic form or omit some constituent members. Further, dimensional ratios between constituent elements illustrated in the drawings do not necessarily represent actual ratios.

First Embodiment

Figure 2:
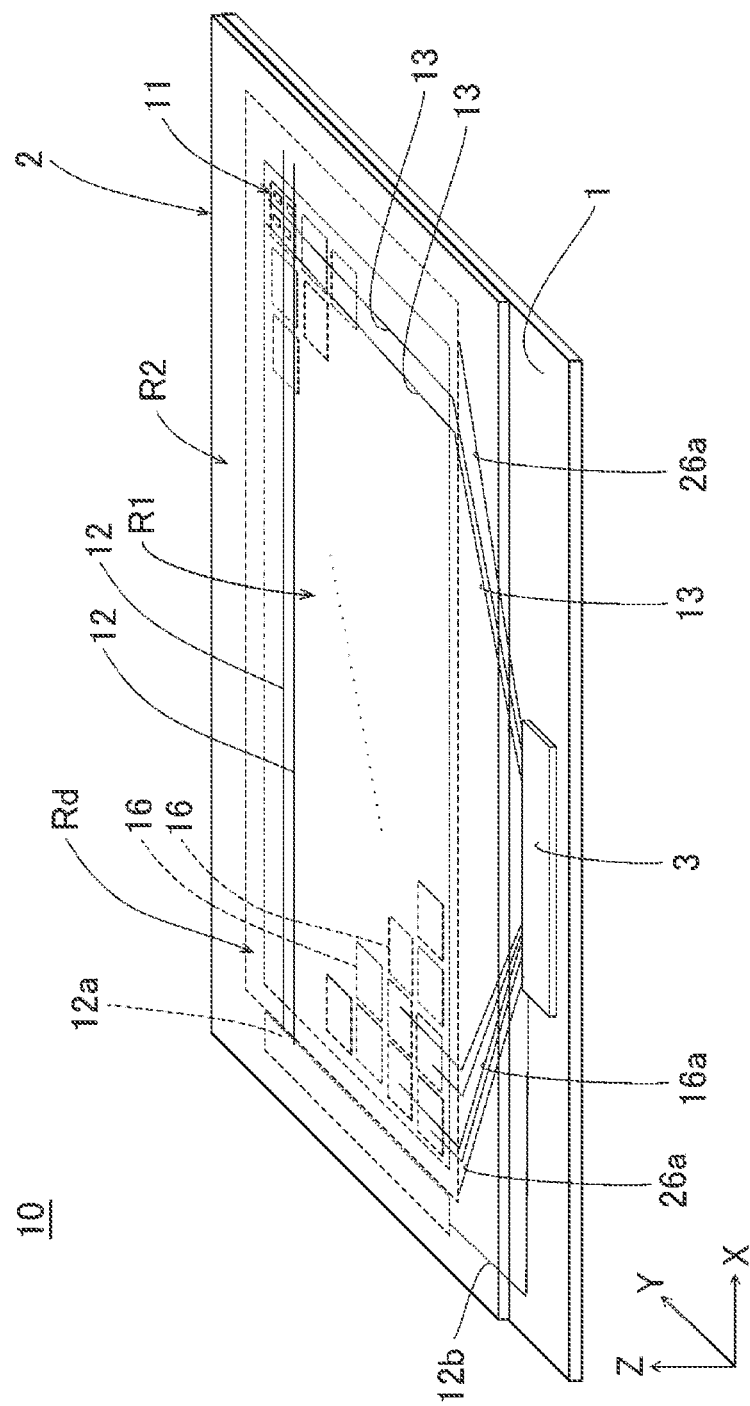
FIG. 2 is a perspective view schematically showing a configuration of a display panel.

FIG. 1 is a block diagram of a display device 100 according to a first embodiment. FIG. 2 is a perspective view schematically showing a configuration of a display panel 10. Configuration examples of the display device 100 include, but are not limited to, a smartphone, a table terminal, and a personal computer. As shown in FIG. 1, the display device 100 includes the display panel 10 and a control circuit 20. The control circuit 20 includes a timing controller that sends control signal to a drive circuit 3 (see FIG. 2) disposed in the display panel 10.

Overall Configuration of Display Panel

In the first embodiment, the display panel 10 is a transverse electric field (FFS) liquid crystal panel having a function of detecting a touch given by an indicator. As shown in FIG. 2, the display panel 10 includes an active matrix substrate 1 and a counter substrate 2. The active matrix substrate 1 is also called "array substrate". The counter substrate 2 is provided with a color filter, and is also called "color filter substrate". The active matrix substrate 1 and the counter substrate 2 are joined together via a seal material (not illustrated) so that their surfaces face each other and a predetermined space is retained. The space between the active matrix substrate 1 and the counter substrate 2 are filled with a liquid crystal material (not illustrated).

As shown in FIG. 2, the active matrix substrate 1 and the counter substrate 2 are not identical in dimension to each other. For example, the active matrix substrate 1 is greater in length than the counter substrate 2 in a Y direction. Moreover, the drive circuit 3 is disposed in a region on the active material substrate 1 not covered with the counter substrate 2. The drive circuit 3 includes an integrated circuit. Further, the drive circuit 3 is connected to the control circuit 20 (see FIG. 1) via a flexible printed board (not illustrated). Further, although not illustrated, optical plates such a phase difference plate and a polarizing plate are disposed on display and back surfaces of the display panel 10. Further, a backlight (not illustrated) is disposed behind the display panel 10.

Configuration of Counter Substrate

The counter substrate 2 includes a glass plate. Further, a light-shielding film (black matrix) and the color filter are formed at a surface of the counter substrate 2 adjoining a liquid crystal layer. Moreover, an overcoat film is formed at sides of the light-shielding film and the color filter that face the liquid crystal layer. Further, the counter substrate 2 has a photospacer disposed to keep the space (i.e. the thickness of the liquid crystal layer) between the active matrix substrate 1 and the counter substrate 2.

Configuration of Active Matrix Substrate

As shown in FIG. 2, the active matrix substrate 1 is provided with a pixel region R1 where a plurality of pixels 11 are formed and a frame region R2 surrounding the pixel region R1. The "pixels" are portions of the active matrix substrate 1 that serve as units of picture or image display and to regions demarcated by a plurality of scanning lines 12 and a plurality of data lines 13. In each of the pixels 11, a thin-film transistor 14 (hereinafter referred to as "TFT 14") and a pixel electrode 15 are disposed. In other words, the pixel region R1 is a display region where a picture or an image is displayed. In other words, the frame region R2 is a non-display region where no picture or image is displayed. The frame region R2 is a region where circuits and wires are disposed. Further, the light-shielding film is disposed in a position on the counter substrate 2 that faces the frame region R2, so that light from the frame region R2 is blocked by the counter substrate 2. This disables a user to visually recognize the structures (circuits and wires) in the frame region R2.

Figure 3:
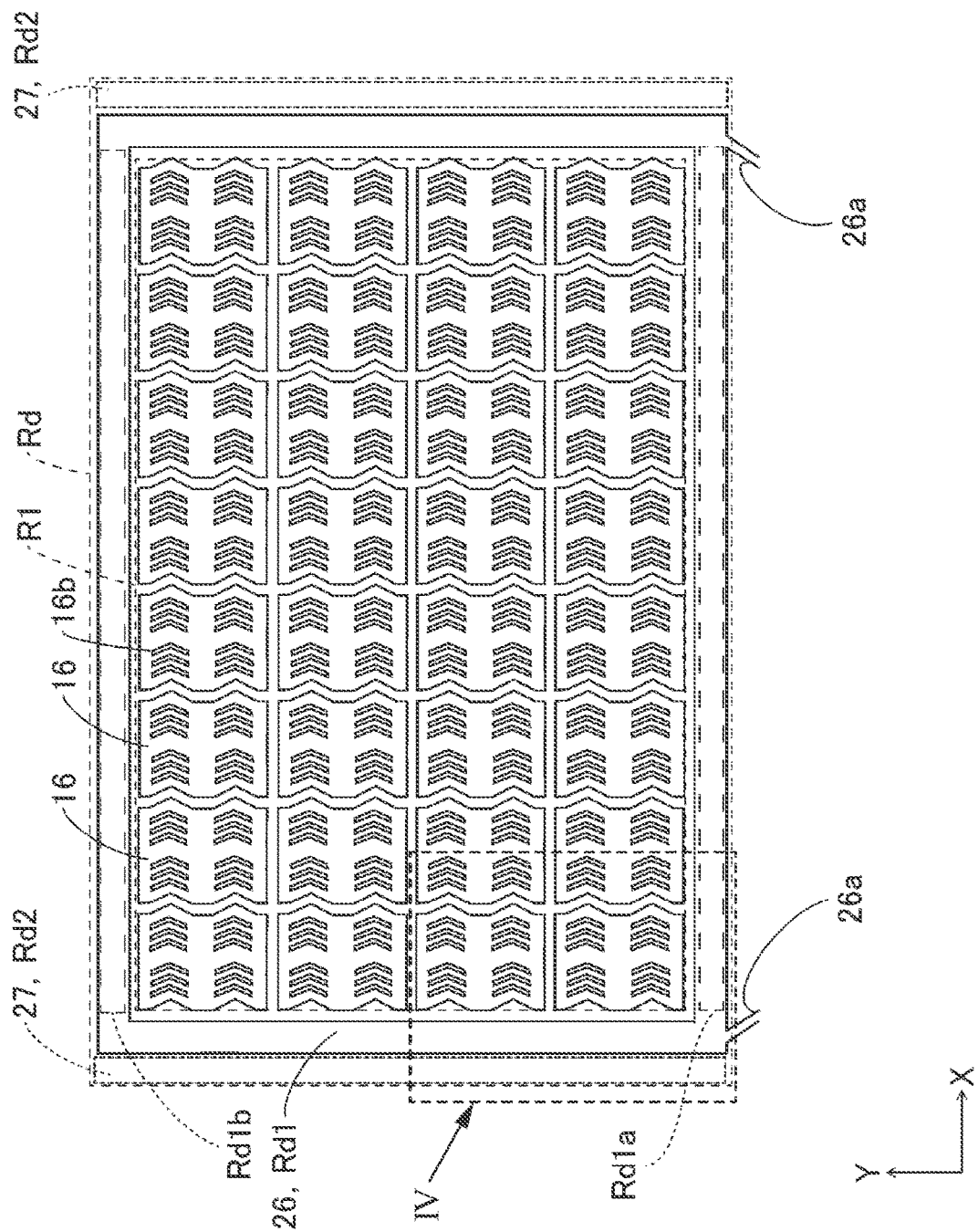
FIG. 3 is a plan view schematically showing a positional relationship between a touch electrode and a frame touch electrode according to the first embodiment.
Figure 4:
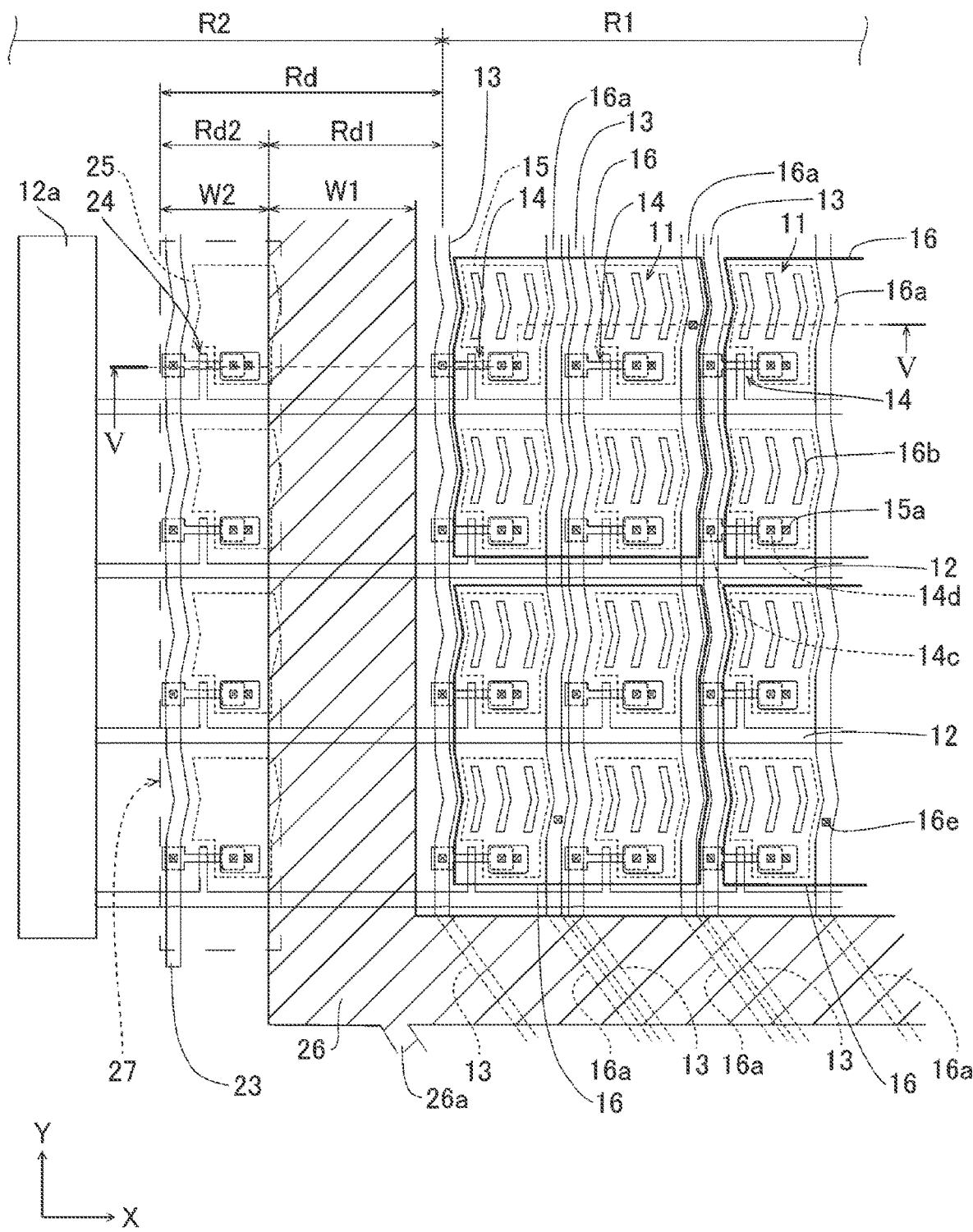
FIG. 4 is an enlarged view of a portion IV of FIG. 3.

FIG. 3 is a plan view schematically showing a positional relationship between a touch electrode 16 and a frame touch electrode 26 according to the first embodiment. FIG. 4 is an enlarged view of a portion IV of FIG. 3. In the first embodiment, as shown in FIG. 3, a dummy region Rd is provided in a position in the frame region R2 adjacent to the pixel region R1. The dummy region Rd is a region where either the after-mentioned frame touch electrode 26 or dummy array segment 27 is disposed. The pixel region R1 has, for example, the shape of a rectangle in plan view. The dummy region Rd is formed in the shape of a frame surrounding the rectangular pixel region R1.

Figure 5:
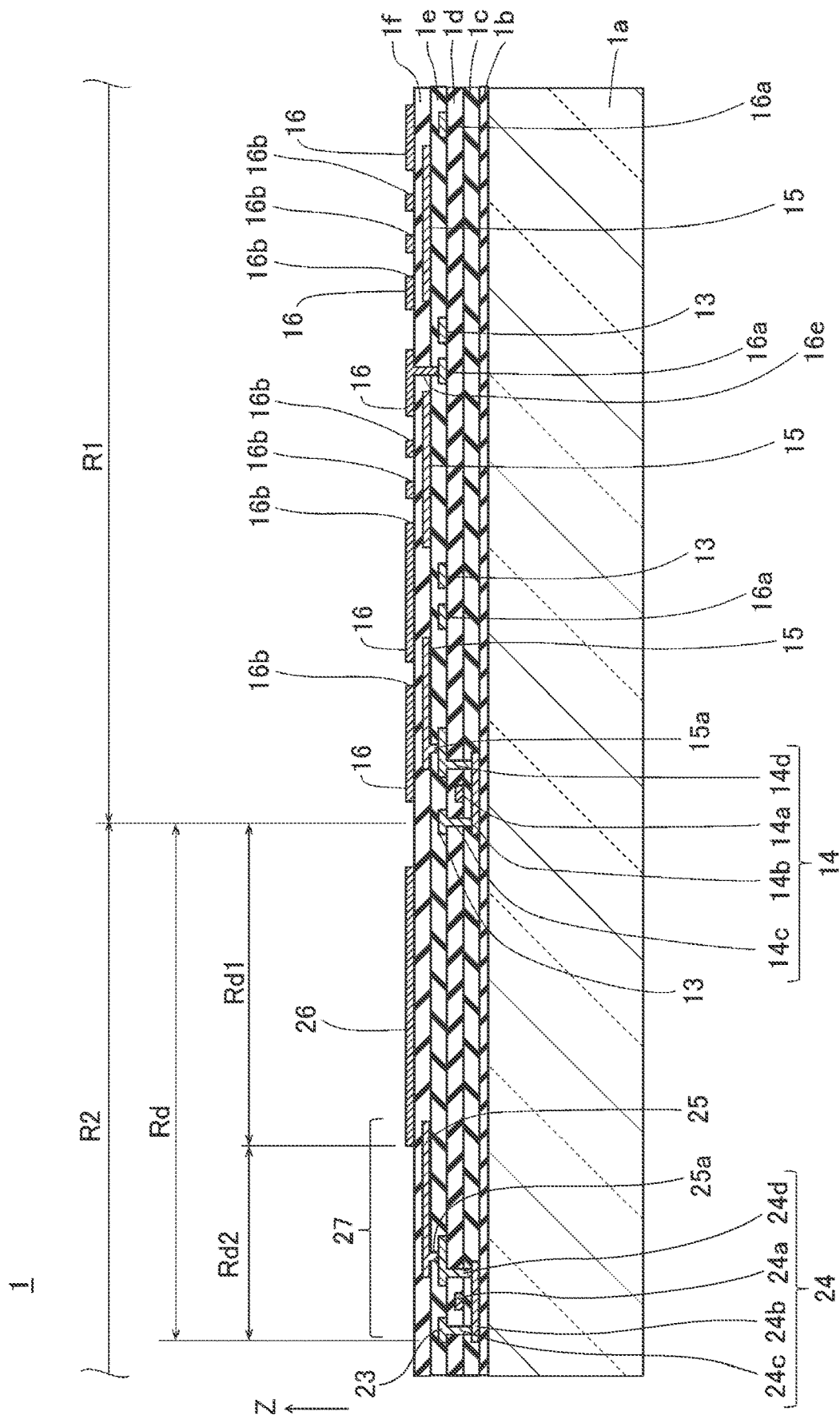
FIG. 5 is a cross-sectional view of an active matrix substrate as taken along line V-V in FIG. 4.

FIG. 5 is a cross-sectional view of the active matrix substrate 1 as taken along line V-V in FIG. 4. As shown in FIG. 5, the active matrix substrate 1 includes a glass substrate 1a. Moreover, at a surface of the glass substrate 1a that faces the liquid crystal layer (in a Z direction of FIG. 5), the scanning lines 12 (see FIG. 4), the data lines 13, the pixel electrode 15, the touch electrode 16, and terminals (not illustrated) are formed. Further, in the first embodiment, a TFT 14 formed by a low-temperature polycrystalline silicon process is formed on top of the active matrix substrate 1. Further, as shown in FIG. 2, a monolithically-formed scanning line driving circuit 12a is disposed on top of the active matrix substrate 1. Moreover, the scanning line driving circuit 12a supplies the scanning lines 12 with gate signals. The scanning line driving circuit 12a is connected to the drive circuit 3 via a scanning line driving circuit wire 12b. The drive circuit 3 controls the scanning line driving circuit 12a by sending a control signal to the scanning line driving circuit 12a. Further, the data lines 13 are connected to the drive circuit 3. Moreover, the data lines 13 are supplied with data signals from the drive circuit 3.

As shown in FIG. 4, in each of the pixels 11, a TFT 14 and a pixel electrode 15 connected to the TFT 14 are disposed. Further, a touch electrode 16 disposed common to a plurality of the pixel electrodes 15 is disposed on top of the active matrix substrate 1. Although FIG. 4 shows an example in which one touch electrode 16 is disposed for four pixel electrodes 15, one touch electrode 16 may be disposed for three or less or five or more pixel electrodes 15.

A plurality of the touch electrodes 16 are arranged in a matrix. As shown in FIG. 2, the plurality of touch electrodes 16 are each connected to the drive circuit 3 via a touch electrode wire 16a. The drive circuit 3 functions as both a touch detection circuit and a display control circuit. In a period of time during which a display is carried out by the display panel 10, the drive circuit 3 supplies each touch electrode 16 with a common electrode voltage for generating electric fields with the pixel electrode 15. In a period of time during which touch detection is carried out by the display panel 10, the drive circuit 3 supplies each touch electrode 16 with a scan signal for detecting a touch. For example, the drive circuit 3 alternately repeats a display period and a touch detection period in a time-sharing manner.

Configuration of Components in Active Matrix Substrate

As shown in FIG. 4, the scanning lines 12 are wires through which each pixel electrode 15 in the pixel region R1 is supplied with a gate signal on a row-by-row basis to be brought into a written state. The scanning lines 12 are wires extending from the scanning line driving circuit wire 12b rightward (X direction) on the surface of paper. Each of the scanning lines 12 is connected to gate electrodes 14a (see FIG. 5) of the TFTs 14 of pixels disposed adjacent to the scanning line 12. The supply of gate signals to the scanning lines 12 brings the TFTs 14 into an on state on a row-by-row basis.

The data lines 13 are wires through which each pixel electrode 15 is supplies with a voltage corresponding to a picture. The data lines 13 are wires extending in a longitudinal direction (Y direction) on the surface of paper. In the first embodiment, the display device 100 is of an FFS type; therefore, as shown in FIG. 4, parts of the contours of the pixel electrode 15 extending in a longitudinal direction include bends curved in plan view. Further, in order to ensure the aperture ratio of the display panel 10, the data lines 13 have shapes taken along the bends of the pixel electrode 15 in plan view. That is, the data lines 13 are provided with bends.

As shown in FIG. 5, each of the TFTs 14 includes a gate electrode 14a, a semiconductor layer 14b, a source electrode 14c, and a drain electrode 14d. The TFT 14 has, for example, a top-gate structure. That is, the gate electrode 14a is disposed at a higher layer (i.e. closer to the liquid crystal layer) than the semiconductor layer 14b. Further, the source electrode 14c is connected to a data line 13. Further, the source electrode 14c has a part disposed in a contact hole and in contact with the semiconductor layer 14b. Further, the drain electrode 14d is connected to the pixel electrode 15. Further, the drain electrode 14d has a part disposed in a contact hole and in contact with the semiconductor layer 14b.

The pixel electrode 15 is disposed in each pixel 11. In a case where a color display is carried out, each pixel 11 is composed of three subpixels corresponding to three primary colors of RGB. In this case, the pixel electrode 15 has an array of elongated subpixels each having an aspect ratio of 3:1; however, for convenience of explanation, FIG. 4 illustrates pixels each having the shape of a square.

The touch electrode 16 is an electrode for touch detection and an electrode through which the liquid crystal layer is controlled. Further, the touch electrode wire 16a is a wire through which the touch electrode 16 is supplied with a signal. As shown in FIG. 4, a plurality of the touch electrode wires 16a are arranged side by side at predetermined spacings from side to side on the surface of paper in the pixel region R1. Further, the touch electrode wire 16a has a shape taken along the bends of the data lines 13 in order to improve the aperture ratio of the display panel 10 and so as not to come too close to the data lines 13. The plurality of touch electrode wires 16a are connected separately (in one-to-one correspondence) to each of the touch electrodes 16. Further, each of the right and left sides of the touch electrode 16 on the surface of paper includes bends curved along the shape of the bends of the data lines 13. Further, the touch electrode 16 is provided with slits 16b curved in plan view separately for each of the pixels 11 (subpixels).

Configuration in Dummy Region

As shown in FIG. 4, the dummy region Rd is provided in a space in the frame region R2 between the pixel region R1 and the scanning line driving circuit 12a. The dummy region Rd is a region extending from a boundary between the pixel region R1 and the frame region R2 to a position where the after-mentioned dummy array segment 27 is disposed and a position furthest away from the boundary. The dummy region Rd includes a first dummy region Rd1 provided in a position adjacent to the pixel region R1 and a second dummy region Rd2 provided in a position opposite to the pixel region R1 across the first dummy region Rd1 (i.e. a position further away from the pixel region R1 than the first dummy region Rd1). For example, the second dummy region Rd2 is provided closer to the scanning line driving circuit 12a than the first dummy region Rd1. Note here that in the present disclosure, a configuration in the first dummy region Rd1 and a configuration in the second dummy region Rd2 are different from each other. For example, the first dummy region Rd1 and the second dummy region Rd2 differ from each other in terms of the presence or absence and form of the frame touch electrode 26 and the presence or absence and form of the dummy array segment 27. In the first embodiment, the frame touch electrode 26 is disposed in the first dummy region Rd1. In the second dummy region Rd2, the frame touch electrode 26 is not disposed, but the dummy array segment 27 is disposed. That is, the first dummy region Rd1 ranges from an end of the dummy region Rd beside the pixel region R1 to an end of the frame touch electrode 26 opposite to the pixel region R1. Further, the second dummy region Rd2 ranges from an end of the frame touch electrode 26 opposite to the pixel region R1 to an end of a region where the dummy array segment 27 is disposed opposite to the pixel region R1.

First Dummy Region: Configuration of Frame Touch Electrode

The first dummy region Rd1 is a region intended to improve the sensitivity of touch detection at or near an end of the pixel region R1. As shown in FIG. 3, the frame touch electrode 26 is disposed in the first dummy region Rd1. The frame touch electrode 26 is not electrically connected to the touch electrode 16 in the pixel region R1. Further, the frame touch electrode 26 has the shape of a frame surrounding the pixel region R1 in plan view. Further, a frame touch electrode wire 26a is connected to an end of the frame touch electrode 26 beside the drive circuit 3. The frame touch electrode 26 is connected to the drive circuit 3 via the frame touch electrode wire 26a. The drive circuit 3 supplies the frame touch electrode 26 with a dummy common electrode voltage and a scan signal for detecting dummy touch detection. The "dummy common electrode voltage" here is a voltage that is supplied at the same voltage value within the same period of time (display period) as the common electrode voltage, although not used for a picture or an image. Further, the "scan signal for detecting dummy touch detection" is a signal that is supplied for improvement in sensitivity of touch detection at the end of the pixel region R1, although not used for touch detection in a position where the frame touch electrode 26 is disposed. That is, the "scan signal for detecting dummy touch detection" is a signal that is used for touch detection at and near an end of the pixel region R1 beside the frame region R2. Further, the "scan signal for detecting dummy touch detection" is sent within a touch detection period.

In a case where a frame touch electrode and a dummy array segment are disposed to wholly overlap each other in plan view, the dimensions of the frame touch electrode need to be set to be an integer multiple (multiple) of the dimensions of a dummy pixel in the dummy array segment. On the other hand, in the first embodiment, as shown in FIG. 4, the frame touch electrode 26 and the dummy array segment 27 only partially overlap each other in plan view, the width W1 of the frame touch electrode 26 in the X direction can be arbitrarily set so that an area that the frame touch electrode 26 needs can be ensured. That is, in the first embodiment, the width W1 of the frame touch electrode 26 can be set so that a size (area) that the frame touch electrode 26 needs in terms of operation can be ensured as dimensions that are independent of the dimensions of the dummy array segment 27. Further, although the frame touch electrode 26 is overlapped with the scanning lines 12 in plan view as well as part of the dummy array segment 27, there is only a low possibility of a short circuit being caused by foreign matter being mixed in between the frame touch electrode 26 and other electrodes or wires, as substantially no other electrodes or wires are present. Further, although FIG. 4 illustrates the width W1 of the frame touch electrode 26 as being greater than the width W2 of the dummy array segment 27, the width W1 may be less than or equal to the width W2.

According to the foregoing configuration, the frame touch electrode 26 can be preferentially disposed in a position closer to the touch electrode 16 than the dummy array segment 27, as the frame touch electrode 26 is provided in the dummy region Rd1 adjacent to the pixel region R1. This results in making it possible to improve the sensitivity of touch detection at and near an end of the pixel region R1. Further, as noted above, the area of the frame touch electrode 26 can be arbitrarily set. This makes it possible to reduce the load on the frame touch electrode 26 and improve the magnitude of a signal from the frame touch electrode 26. Further, since the frame touch electrode 26 is not provided in the second dummy region Rd2, a short circuit can be restrained from being caused by foreign matter being mixed in between the frame touch electrode 26 and other wires or electrodes. This results in making it possible to reduce the possibility of the active matrix substrate 1 becoming defective (i.e. to improve yields).

Further, as shown in FIG. 3, in a region Rd1a in the dummy region Rd that is further downward (closer to the drive circuit 3) than the pixel region R1 on the surface of paper, the second dummy region Rd2 (dummy array segment 27) is not provided, but only the first dummy region Rd1 (frame touch electrode 26) is provided. Further, in a region Rd1b in the dummy region Rd that is further upward than the pixel region R1 on the surface of paper, the second dummy region Rd2 (dummy array segment 27) is not provided, but only the first dummy region Rd1 (frame touch electrode 26) is provided.

Second Dummy Region: Configuration of Dummy Array Segment

The second dummy region Rd2 is a region intended to reduce defects (i.e. to improve yields) in the process of manufacturing the active matrix substrate 1. Specifically, the dummy array segment 27 is disposed in the second dummy region Rd2 to protect the wires in the pixel region R1, the pixel electrode 15, and the TFT 14 from static electricity generated in the process of manufacture. Note here that the dummy array segment 27 is a frame element, formed at a layer different from the layer at which the frame touch electrode 26 is formed in the frame region R2, that suppresses an electrostatic discharge failure of a pixel 11 in the pixel region R1 by being destructed by static electricity from around the active matrix substrate 1. That is, even in the case of entry of static electricity into the active matrix substrate 1 from the surrounding in the process of manufacturing the active matrix substrate 1 or after completion of the active matrix substrate 1, structures in the pixels 11 can be restrained from becoming defective, as the dummy array segment 27 suffers from electrostatic discharge failure before the static electricity is transmitted to the pixels 11 in the pixel region R1. That is, the dummy array segment 27 functions as an electrostatic protection element.

As shown in FIG. 4, the dummy array segment 27 has an array structure in imitation of at least some of the structures in the pixels 11 of the pixel region R1. Specifically, the dummy array segment 27 includes parts of the scanning lines 12, a dummy data line 23, a dummy thin-film transistor 24 (hereinafter referred to as "dummy TFT 24"), and a dummy pixel electrode 25. The dummy data line 23, the dummy TFT 24, and the dummy pixel electrode 25 are at the same layer as, are made of the same material as, and have the same planimetric shape as the data lines 13, the TFT 14, and the pixel electrode 15, respectively. Thus, during execution of the step of manufacturing the data lines 13, the destruction of a data line 13 by entry of static electricity from around the active matrix substrate 1 can be inhibited by the dummy data line 23. Further, during execution of the step of manufacturing a plurality of the TFTs 14, the destruction of a TFT 14 by entry of static electricity from around the active matrix substrate 1 can be inhibited by the dummy TFT 24. Further, during execution of the step of manufacturing a plurality of the pixel electrodes 15, the destruction of a pixel electrode 15 by entry of static electricity from around the active matrix substrate 1 can be inhibited by the dummy pixel electrode 25. This makes it possible to protect the structures in the pixels 11 of the pixel region R1 from static electricity even in the process of manufacturing the active matrix substrate 1. This results in a reduction in percent defective of the structures in the pixels 11 of the pixel region R1.

As noted above, the overlap of the frame touch electrode 26 with other electrodes or wires in plan view puts a greater load on the frame touch electrode 26, making it easy to be short-circuited with the other electrodes or wires. On the other hand, in the first embodiment, the dummy array segment 27 is substantially wholly disposed in the second dummy region Rd2. As shown in FIG. 5, part of the dummy pixel electrode 25 of the dummy array segment 27 and part of the frame touch electrode 26 are disposed to overlap each other in plan view via a fourth insulating film 1e. In a case where the pixel region R1 is smaller than it is in the example shown in FIG. 5, the frame touch electrode 26 becomes smaller in length, so that the load is reduced. Therefore, the area of overlap between the dummy array segment 27 and the frame touch electrode 26 in plan view may be made larger than it is in the example shown in FIG. 5.

Further, in a case where the area of a dummy electrode 25 included in the dummy array segment 27 is made smaller than the area of a pixel electrode 15, a portion of the dummy array segment 27 other than the dummy pixel electrode 25 and the frame touch electrode 26 may be disposed to overlap in plan view. In a case where the area of overlap between the dummy array segment 27 and the frame touch electrode 26 is made larger, the frame region R2 can be made smaller in size.

As shown in FIG. 3, in the regions Rd1a and Rd1b, the frame touch electrode 26 is disposed, and the dummy array section 27 is not disposed. For this reason, the frame touch electrode 26 does not interfere with other driving circuits or wires. In particular, in the region Rd1a, the data lines 13 and the touch electrode wire 16a do not interfere with the dummy array segment 27 of the second dummy region Rd2. This results in making it possible to make the frame region R2 of the display panel 10 smaller than in a case where data lines and touch electrode wires are disposed to circumvent a dummy array segment of a second dummy region in order to be restrained from interfering with the dummy array segment. In the present disclosure, the second dummy region Rd2 may be provided in the regions Rd1a and Rd1b in a case where there is no problem with the frame region R2 being made larger in size.

Method for Manufacturing Active Matrix Substrate

Next, a method for manufacturing an active matrix substrate 1 is described with reference to FIG. 5.

Formation of Base Coat Film

As shown in FIG. 5, on a surface of a glass substrate 1a made of alkali-free glass or other materials, a base coat film 1b (first insulating film) made of at least either silicon oxide or silicon nitride is formed. The base coat film 1b is continuously formed in the pixel region R1 and the frame region R2.

Formation of Semiconductor Layer and Dummy Semiconductor Layer

Next, a thin film of silicon is formed on top of the base coat film 1b. Then, this thin film of silicon is heated by a laser or other pieces of equipment and then cooled, and a semiconductor layer 14b and a dummy semiconductor layer 24b of a dummy TFT 24, which are constituted by a thin film of polycrystalline silicon, are formed as an identical layer. After that, the semiconductor layer 14b and the dummy semiconductor layer 24b are patterned into a predetermined shape. In the first embodiment, the semiconductor layer 14b and the dummy semiconductor layer 24b have an identical shape.

Formation of Gate Insulating Film

A gate insulating film 1c (second insulating film) constituted by a thin film of silicon oxide or silicon nitride is formed so as to cover the semiconductor layer 14b and the dummy semiconductor layer 24b so that the semiconductor layer 14b and a gate electrode 14a do not touch each other and so that the dummy semiconductor layer 24b and a dummy gate electrode 24a do not touch each other. The gate insulating film 1c is continuously formed in the pixel region R1 and the frame region R2.

Formation of Gate Electrode and Dummy Gate Electrode

Then, on top of the gate insulating film 1c, the gate electrode 14a of a TFT 14, the dummy gate electrode 24a of the dummy TFT 24, and scanning lines 12, which are constituted by a thin film of high-melting-point metal such as tantalum or tungsten, are formed as an identical layer and each patterned into a predetermined shape. In the first embodiment, the gate electrode 14a and the dummy gate electrode 24a are made of an identical material and patterned into an identical shape.

Formation of Interlayer Film

Then, a third insulating film 1d (interlayer film) constituted by a thin film of silicon oxide or silicon nitride is formed so as to cover the gate electrode 14a, the dummy gate electrode 24a, and the scanning lines 12. The third insulating film 1d is continuously formed in the pixel region R1 and the frame region R2. After the third insulating film 1d has been formed, various contact holes are formed in the gate insulating film 1c and the third insulating film 1d. Specifically, a contact hole in which part of a source electrode 14c is disposed and through which the semiconductor layer 14b and the source electrode 14c are connected to each other and a contact hole in which part of a drain electrode 14d is disposed and through which the semiconductor layer 14b and the drain electrode 14d are connected to each other are formed. Further, a contact hole in which part of a dummy source electrode 24c is disposed and through which the dummy semiconductor layer 24b and the dummy source electrode 24c are connected to each other and a contact hole in which part of the dummy drain electrode 24d is disposed and through which the dummy semiconductor layer 24b and the dummy drain electrode 24d are connected to each other are formed.

Formation of Source Electrode, Data Lines, Drain Electrode, Dummy Source Electrode, Dummy Data Line, Dummy Drain Electrode, and Touch Electrode Wire Then, the source electrode 14c, data lines 13, the drain electrode 14d, the dummy source electrode 24c, a dummy data line 23, the dummy drain electrode 24d, and a touch electrode wire 16a, which are constituted by a thin film of low-resistivity metal (second metal thin film), are formed as an identical layer. As the "low-resistivity metal", a single film or alloy film of aluminum, chromium, or other metals or a metal thin film stacked on titanium or other metals can be used. Then, one end of the semiconductor layer 14b is connected to the source electrode 14c, and the other end of the semiconductor layer 14b is connected to the drain electrode 14d. One end of the dummy semiconductor layer 24b is connected to the dummy source electrode 24c, and the other end of the dummy semiconductor layer 24b is connected to the dummy drain electrode 24d. Thus, the TFT 14 and the dummy TFT 24 are completed. As a result of the steps hitherto described, a monolithic scanning line driving circuit 12a (see FIG. 2) is formed on top of the glass substrate 1a. Further, a terminal through which the drive circuit 3 and the flexible printed board are connected to each other is formed of the after-mentioned transparent oxide thin film in a region in the frame region R2 of the active matrix substrate 1 that is not covered with the counter substrate 2. The dummy TFT 24 is identical in planimetric shape to the TFT 14 in the pixel region R1. However, this is not intended to impose any limitation. For example, the dummy TFT 24 may be smaller in area than the TFT 14 so as to be easily destructed by static electricity. Thus, the dummy TFT 24 is more preferentially subjected to electrostatic discharge failure than the TFT 14 in the pixel region R1, so that the percent defective of TFTs 14 in the pixel region R1 can be further reduced.

Formation of Planarizing Film

A fourth insulating film 1e (planarizing film) is formed on top of the scanning lines 12 thus formed, the TFT 14 thus formed, the dummy TFT 24 thus formed, the data lines 13 thus formed, the dummy data line 23 thus formed, and the touch electrode wire 16a thus formed. As the fourth insulating film 1e, photosensitive resin composed of acrylic resin can be used. Then, in the fourth insulating film 1e, a contact hole 15a through which the drain electrode 14d and a pixel electrode 15 are connected to each other, a contact hole 25a through which the dummy drain electrode 24d and a dummy pixel electrode 25 are connected to each other, and a contact hole 16e through which the touch electrode wire 16a and the touch electrode 16 are connected to each other are formed.

Formation of Pixel Electrode

Then, the pixel electrode 15 and the dummy pixel electrode 25, which are constituted by a first transparent oxide thin film, are formed as an identical layer and patterned into a predetermined shape. As the first transparent oxide thin film, ITO (indium tin oxide) or IZO (indium zinc oxide) can be used. The pixel electrode 15 is separated into each separate pixel (each separate dummy pixel) and patterned into a solid state and a shape bent in plan view for use in FFS.

Formation of Separating Film

After the foregoing step, a separating film 1f (fifth insulating film) for electrically separating the pixel electrode 15 and the touch electrode 16 from each other and for electrically separating the dummy pixel electrode 25 and a frame touch electrode 26 from each other is formed. As the separating film 1f, silicon oxide or silicon nitride is used. Then, a contact hole 16e through which the touch electrode 16 and the touch electrode wire 16a are connected to each other is formed in the separating film 1f.

Formation of Touch Electrode and Frame Touch Electrode

Then, the touch electrode 16 and the frame touch electrode 26, which are constituted by a second transparent oxide thin film, are formed and patterned into a predetermined shape. As the second transparent oxide thin film, ITO or IZO can be used. Then, slits 16b are formed in the touch electrode 16. Thus, the active matrix substrate 1 is completed.

Second Embodiment

Next, a configuration of a display device 200 according to a second embodiment is described with reference to FIGS. 6 to 8. It should be noted that components that are similar to those of the first embodiment are given the same signs as those of the first embodiment, and a description of such components is omitted. For example, components in a pixel region R1 in the display device 200 are similar to those in the pixel region R1 in the display device 100.

Figure 6:
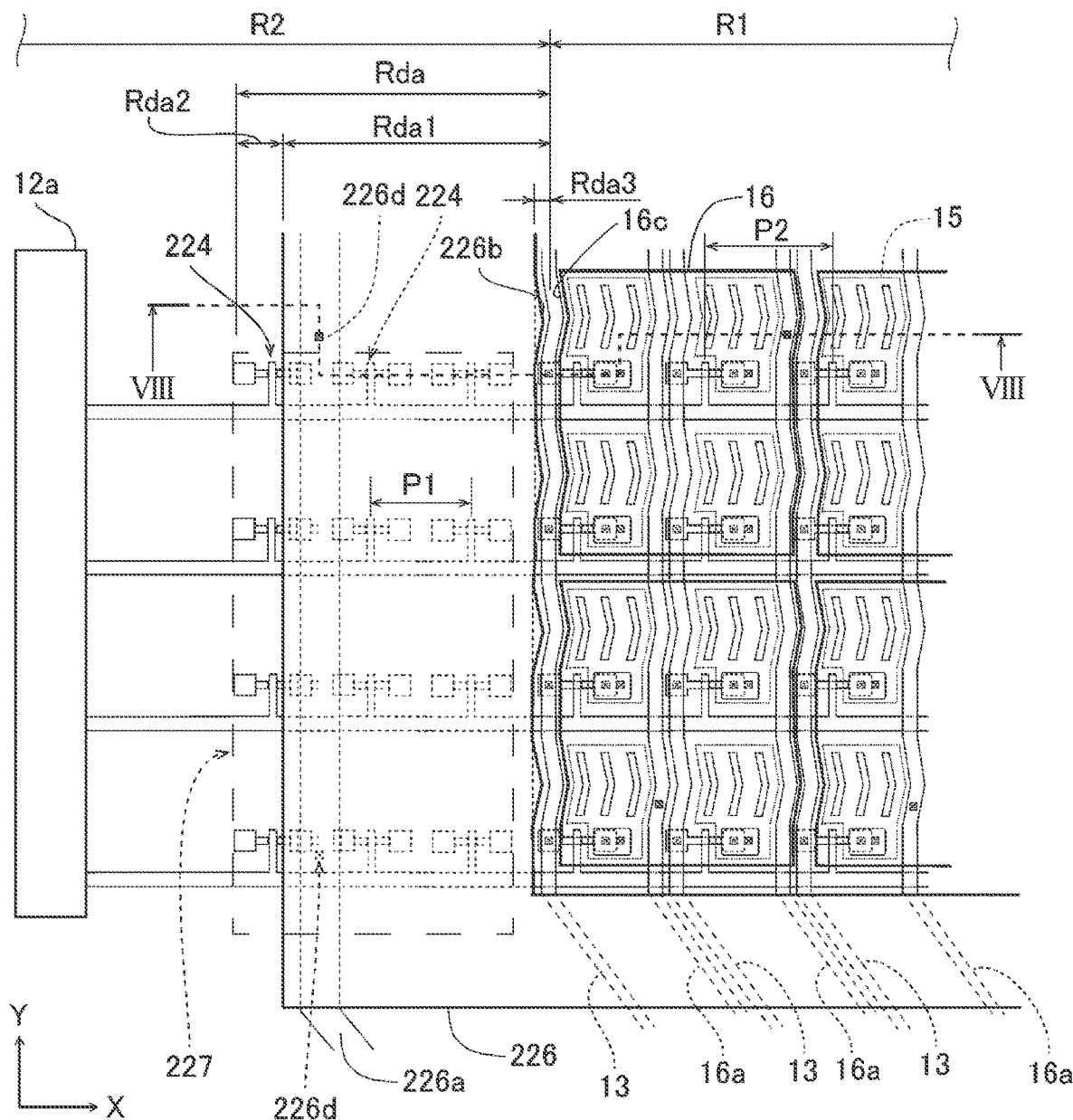
FIG. 6 is a diagram for explaining part of a configuration of a display device according to a second embodiment.

FIG. 6 is a diagram for explaining part of the configuration of the display device 200 according to the second embodiment. FIG. 7 is a schematic plan view for explaining a configuration of a frame touch electrode 226 according to the second embodiment. FIG. 8 is a cross-sectional view of an active matrix substrate 201 as taken along line VIII-VIII in FIG. 6.

Further, the form of a frame touch electrode 226 disposed in a first dummy region Rda1 according to the second embodiment is different from the form of the frame touch electrode 26 according to the first embodiment. Specifically, the frame touch electrode 226 includes a projecting portion 226b projecting toward the pixel region R1. The projecting portion 226b has a shape taken along the shape of a side 16c of the touch electrode 16 beside the frame touch electrode 226 in plan view. Specifically, the side 16c has a bend recessed in the X direction in plan view. Moreover, an end side of the projecting portion 226b beside the pixel region R1 has a bend projecting in the X direction toward the bend of the side 16c. The first dummy region Rda1 includes a third dummy region Rda3 where the projecting portion 226b is provided. The third dummy region Rda3 is provided in part of the first dummy region Rda1 beside the pixel region R1. In the first embodiment, an end side of the frame touch electrode 26 beside the pixel region R1 is formed in a linear shape parallel with the Y direction between the scanning line driving circuit 12a and the pixel region R1.

Further, the form of a dummy array segment 227 disposed in a second dummy region Rda2 according to the second embodiment is different from the form of the dummy array segment 27 according to the first embodiment. Specifically, the dummy array segment 227 according to the second embodiment is not provided with a dummy pixel electrode 25 and include a plurality of dummy TFTs 224. Further, some of the plurality of dummy TFTs 224 are provided in positions overlapping the frame touch electrode 226 in plan view.

Figure 7:
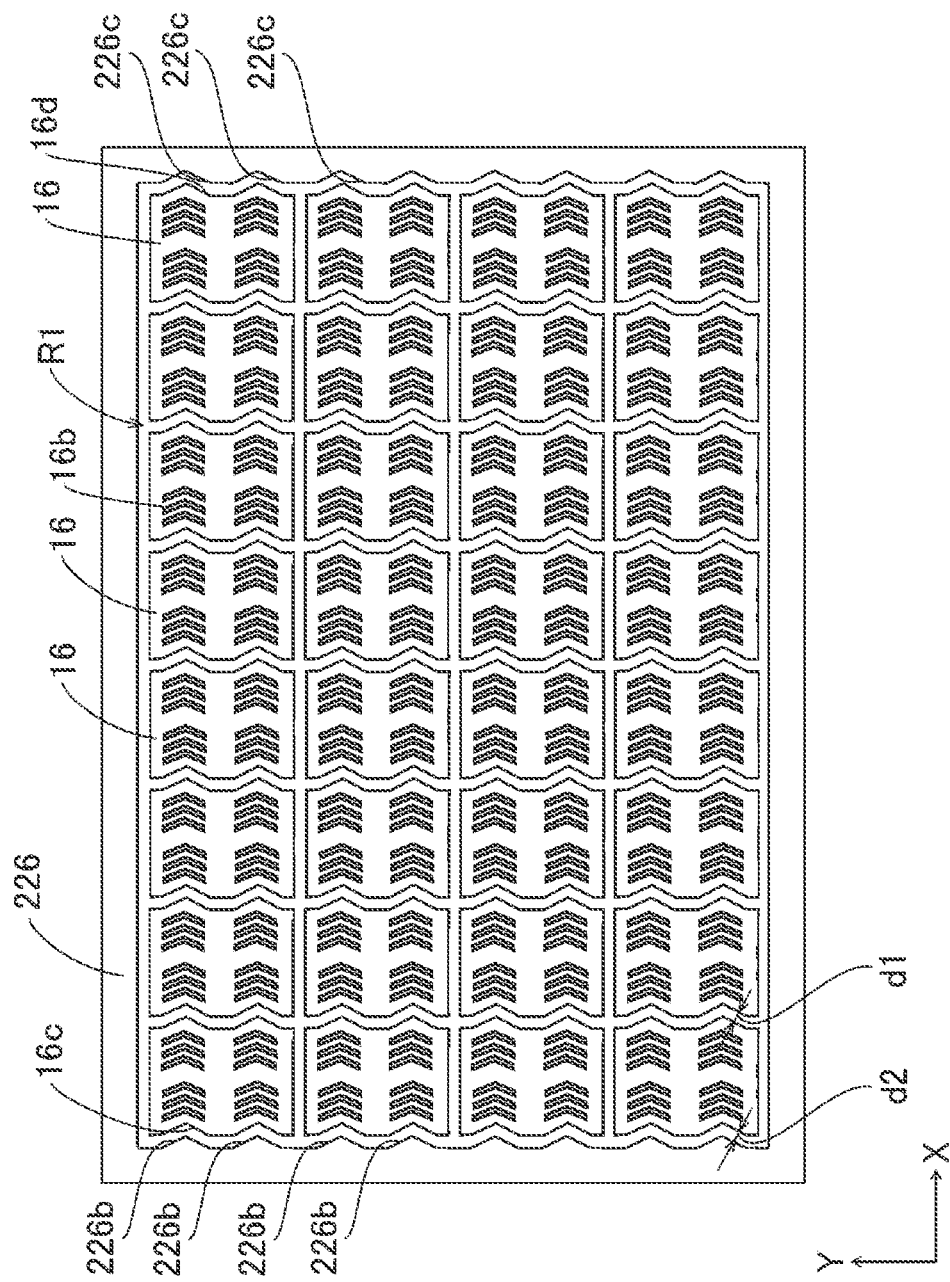
FIG. 7 is a schematic plan view for explaining a configuration of a frame touch electrode according to the second embodiment.
Figure 8:
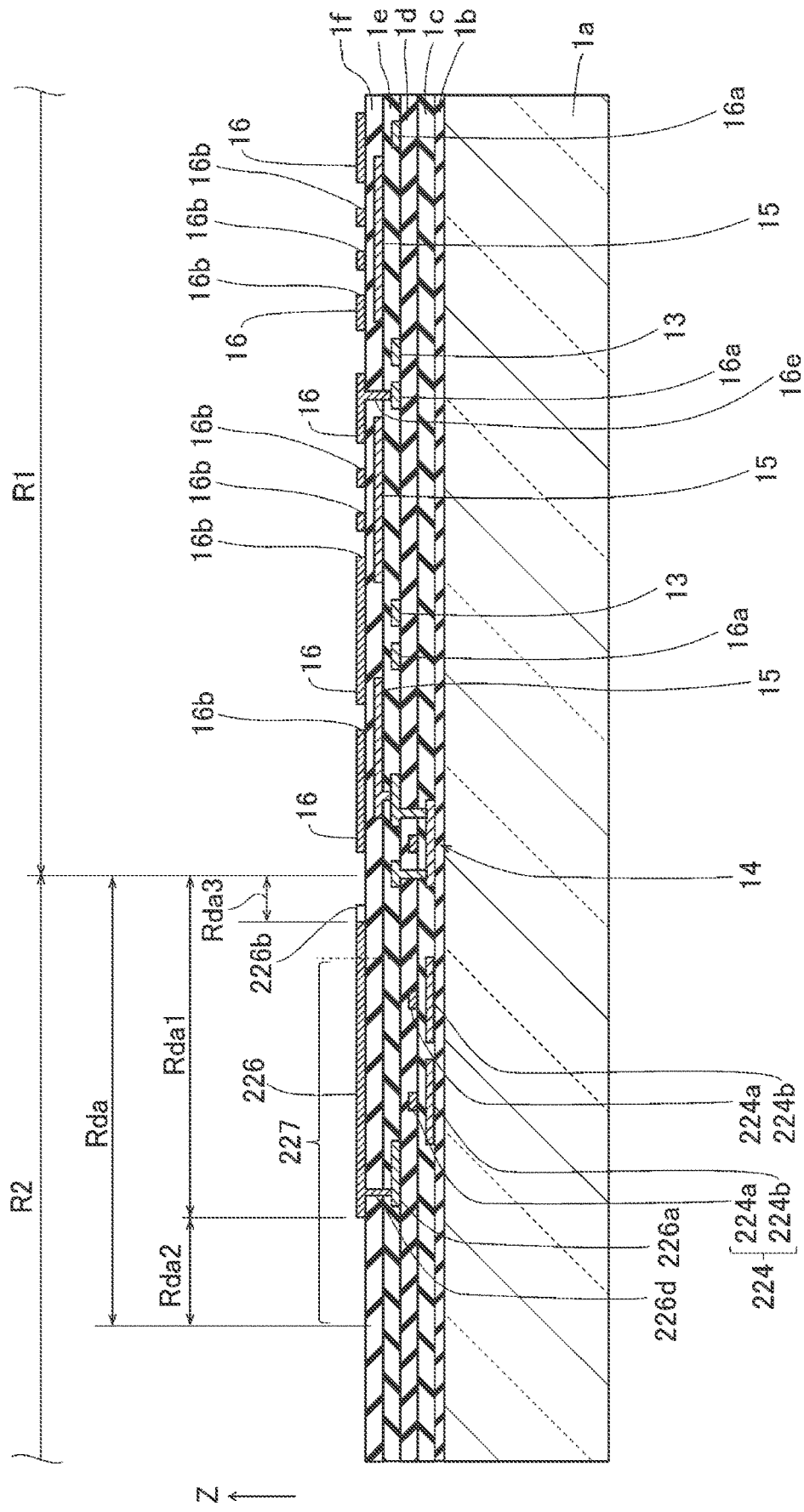
FIG. 8 is a cross-sectional view of an active matrix substrate as taken along line VIII-VIII in FIG. 6.

As shown in FIG. 7, in a portion of the frame touch electrode 226 that is further rightward than the pixel region R1 on the surface of paper, a depressed portion 226c having a shape taken along a side 16d of the touch electrode 16 is provided. Thus, at both an end (one end) of the pixel region R1 that is leftward on the surface of paper and an end (other end) of the pixel region R1 that is rightward on the surface of paper, the frame touch electrode 226 has shapes taken along the sides 16c and 16d, respectively, of the touch electrode 16. As a result of this, part of the frame touch electrode 226 at one end of the pixel region R1 and part of the frame touch electrode 226 at the other end of the pixel region R1 can improve the sensitivity of the touch electrode 16 with similar sizes.

As shown in FIG. 6, the display device 200 according to the second embodiment includes a frame touch electrode wire 226a. The frame touch electrode wire 226a is constituted, for example, by a metal thin film. This makes it possible to reduce the load on the frame touch electrode 226. The frame touch electrode wire 226a is constituted by the aforementioned second metal thin film (thin film of low-resistivity metal), of which the data lines 13 are made. Moreover, as shown in FIG. 8, the frame touch electrode 226 and the frame touch electrode wire 226a are connected to each other via a contact hole 226d provided in the fourth insulating film 1e (planarizing film). Further, the frame touch electrode wire 226a is disposed at a lower layer than the frame touch electrode 226a. Further, as shown in FIG. 7, the frame touch electrode wire 226a is disposed to at least partially overlap the dummy TFTs 224 in plan view. Since the frame touch electrode 226, the frame touch electrode wire 226a, and the dummy TFTs 224 are disposed to partially overlap one another, it is possible to reduce the area in which to dispose these components.

In the second embodiment, more dummy array segments 227 are disposed than in the first embodiment, and the region of overlap between the dummy array segments 227 and the frame touch electrode 226 is larger than in the first embodiment. However, in the second embodiment, the dummy array segments 227 do not include dummy pixel electrodes and are composed only of the dummy TFTs 224, the area of overlap between the frame touch electrode 226 and the dummy array segments 227 in plan view is reduced. This makes it possible to reduce the possibility of the frame touch electrode 226 and another electrode being short-circuited with each other by foreign matter.

Further, the size P1 (pitch) of spacings at which the plurality of dummy TFTs 224 are arranged from side to side on the surface of paper is smaller than the size P2 (pitch) of spacings at which the TFTs 14 are arranged in the pixel region R1. Thus, even when a dummy region Rda is the same in size as the dummy region Rd of the first embodiment, a larger number of dummy TFTs 224 can be arranged than in the first embodiment. As a result of this, even if static electricity has caused ESD damage to proceed in sequence from an end of the active matrix substrate 1, the possibility of the TFTs 14 of the pixel region R1 being destructed can be reduced. Although the dummy TFTs 224 are identical in planimetric shape to the TFTs 14 of the pixel region R1, this is not intended to impose any limitation. For example, the dummy TFTs 224 may not include dummy source or drain electrodes connected via contact holes. Further, for example, the dummy TFTs 224 may be arranged in an orientation that is different from that in which the TFTs 14 are arranged in the pixel region R1. Further, although each of the dummy TFTs 224 is composed of a dummy gate electrode 224a, the gate insulating film 1c, and a dummy semiconductor layer 224b intersecting the dummy gate electrode, the dummy gate electrode 224a may be a scanning line 12 per se instead of being a pattern branching off from a scanning line 12.

The third dummy region Rda3 is a region intended to restrain display quality from deteriorating due to nonuniformity (discontinuity) in circuit constant of the structures in the plurality of pixels 11 in the pixel region R1. One of the factors that have a profound effect on the circuit constant is parasitic capacitance. Accordingly, the deterioration in display quality is avoided by forming parasitic capacitance in the third dummy region Rda3.

Note here that parasitic capacitance is formed between electrodes adjacent to each other. For this reason, the third dummy region Rda3 is provided in a portion of the first dummy region Rda1 that is close to the pixel region R1. Further, the third dummy region Rda3 is adjacent to the data lines 13 and the touch electrode 16 in the pixel region R1.

As shown in FIG. 6, the touch electrode 16 has a line-asymmetric shape with respect to the Y axis. Thus, as shown in FIG. 7, the shape of the projecting portion 226b of the frame touch electrode 226 that is further leftward than the touch electrode 16 on the surface of paper may be a shape that is different from the shape of the depressed portion 226c of the frame touch electrode 226 that is further rightward than the touch electrode 16 on the surface of paper.

As shown in FIG. 7, the size d2 of the spacing between the projecting portion 226b of the frame touch electrode 226 and the touch electrode 16 is equal to the size d1 of the spacing between two touch electrode 16 adjacent to each other from side to side on the surface of paper. Thus, the structures in pixels 11 near an end of the pixel region R1 can be made identical in circuit constant to structures in pixels 11 in the center of the pixel region R1. As a result of this, uniformity in display can be achieved.

Third Embodiment

Figure 10:
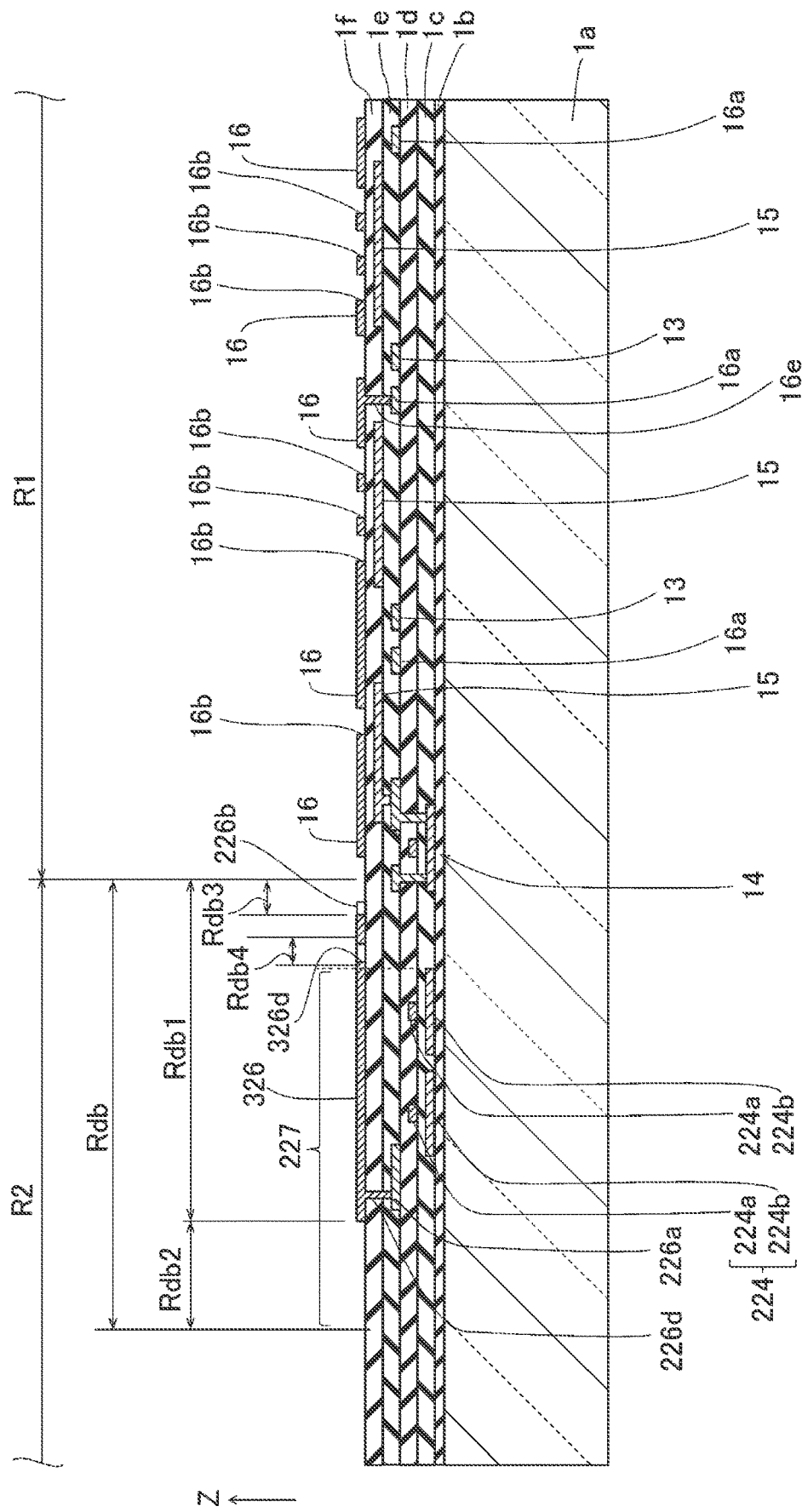
FIG. 10 is a cross-sectional view of an active matrix substrate as taken along line X-X in FIG. 9.
Figure 11:
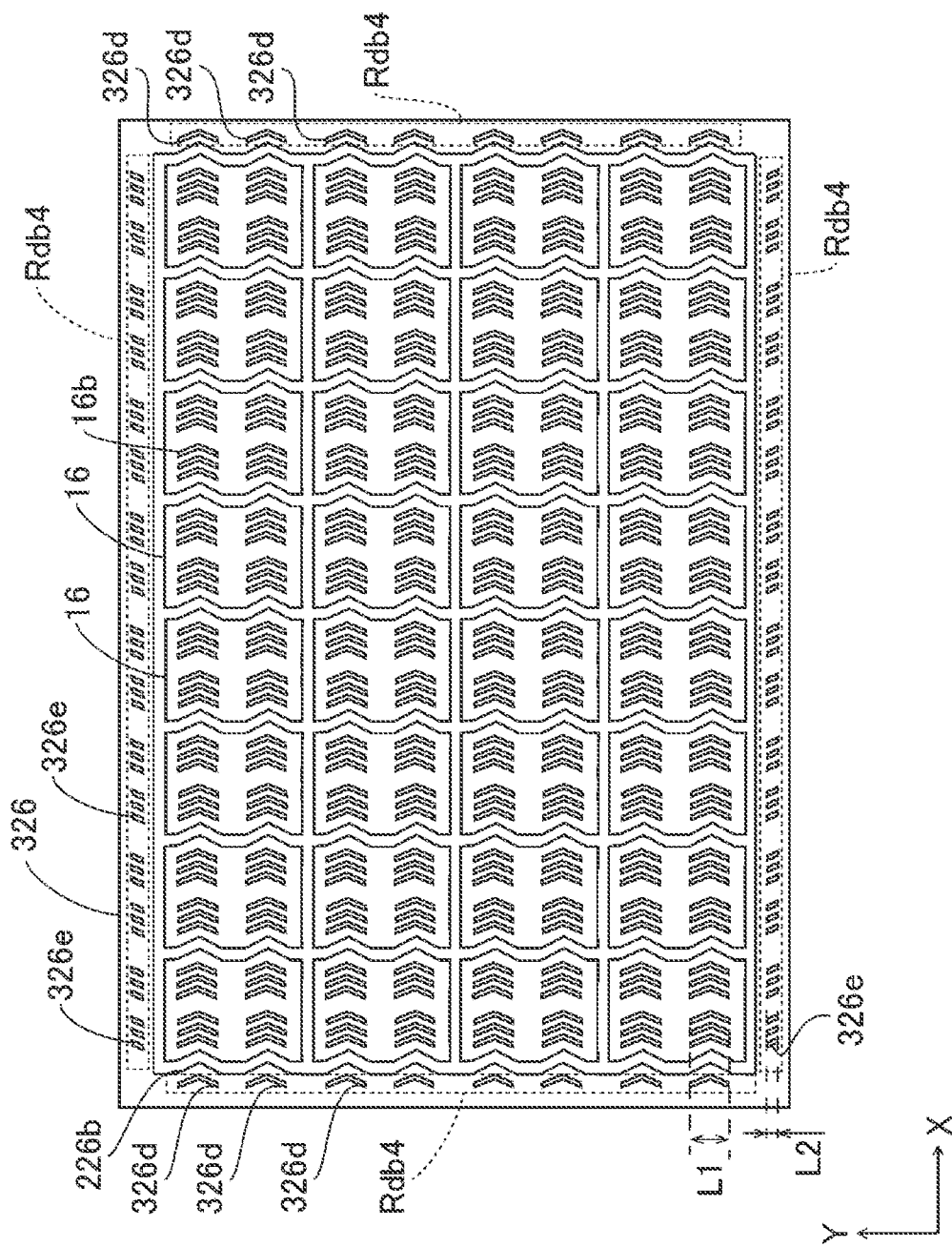
FIG. 11 is a schematic plan view for explaining a configuration of a frame touch electrode according to the third embodiment.

Next, a configuration of a display device 300 according to a third embodiment is described with reference to FIGS. 9 to 11. It should be noted that components that are similar to those of the first or second embodiment are given the same signs as those of the first or second embodiment, and a description of such components is omitted.

Figure 9:
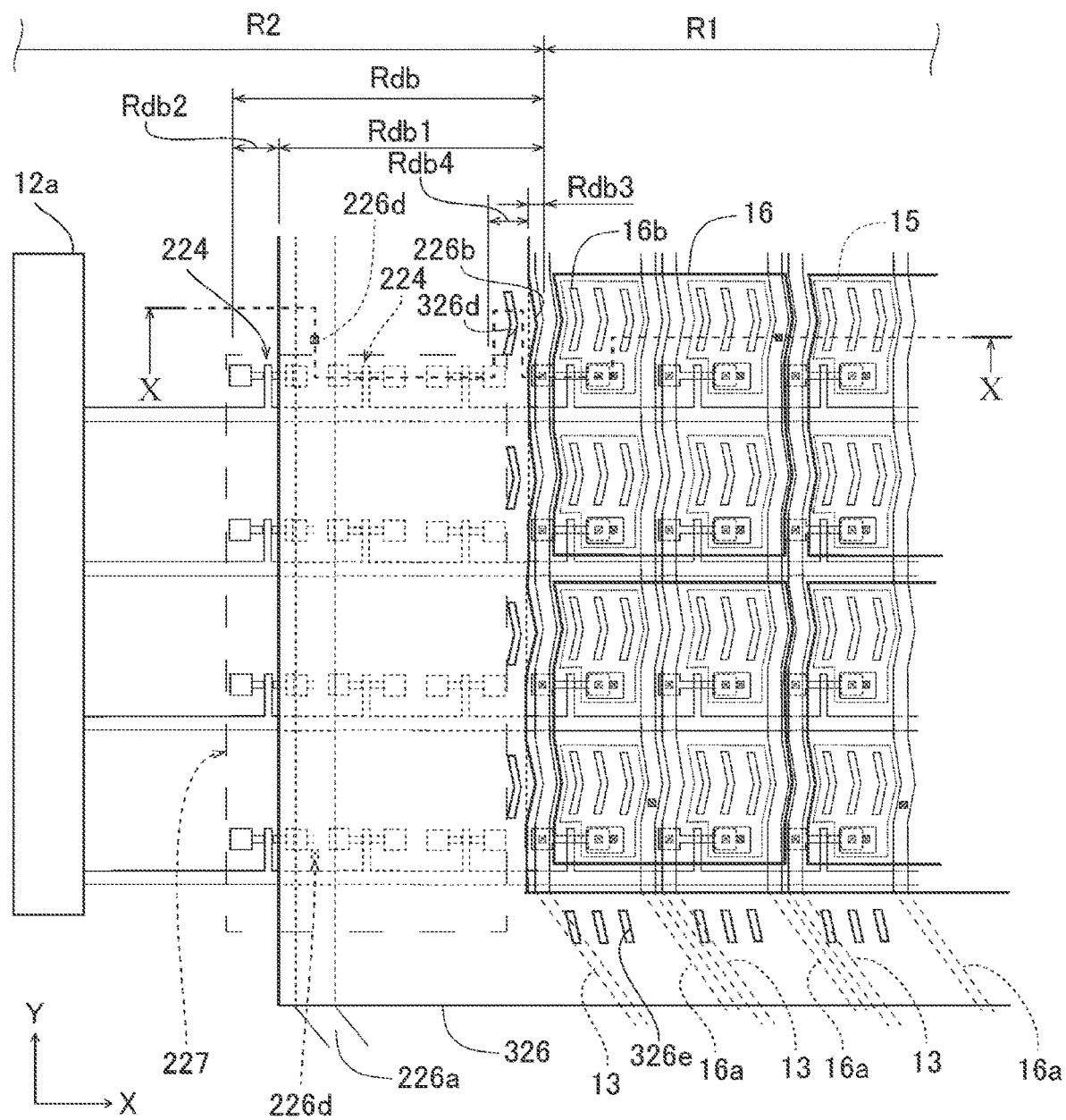
FIG. 9 is a diagram for explaining part of a configuration of a display device according to a third embodiment.

FIG. 9 is a diagram for explaining part of a configuration of the display device 300 according to the third embodiment. FIG. 10 is a cross-sectional view of an active matrix substrate 301 as taken along line X-X in FIG. 9. FIG. 11 is a schematic plan view for explaining a configuration of a frame touch electrode 326 according to the third embodiment.

As shown in FIG. 9, in the third embodiment, in addition to a first dummy region Rdb1, a second dummy region Rdb2, and a third dummy region Rdb3, a fourth dummy region Rdb4 is provided in the first dummy region Rbd1.

The fourth dummy region Rdb4 is a region in the first dummy region Rdb1 that is close to the pixel region R1 and a region where the frame touch electrode 326 has an adjusted pattern density. Further, the fourth dummy region Rdb4 is a region intended to ensure the accuracy of patterning of the pixel electrode 15 and the touch electrode 16. Note here that the pixel electrode 15 and the touch electrode 16 can be patterned using the aforementioned manufacturing method (semiconductor formation process). However, the roughness and fineness of a pattern at an end of the pixel region R1 may change more rapidly than the roughness and fineness of a pattern in a central portion of the pixel region R1. For this reason, at the end, patterning may not be finished with intended shapes or dimensions. On the other hand, in the third embodiment, the fourth dummy region Rdb4 restrains patterning at an end of the pixel region R1 from not being finished with intended shapes or dimensions.

Specifically, the frame touch electrode 326 has dummy slits 326d having shapes that are identical to those of the slits 16b of the touch electrode 16 provided in the pixel region R1. This causes the touch electrode 16 to be patterned uniformly all over the pixel region R1. Further, the dummy slits 326d are not provided all over the frame touch electrode 326 but provided only in some region (fourth dummy region Rdb4) that is close to the pixel region R1. This makes it possible to restrain the area of the frame touch electrode 326 from becoming smaller beyond necessity. For example, as shown in FIG. 11, one dummy slit 326d per row of pixels is provided at each of the right and left sides of the pixel region R1 on the surface of paper. Further, the number of dummy slits 326e formed in the fourth dummy region Rdb4 provided at the upper and lower sides of the pixel region R1 on the surface of paper is equal to the number of slits 16b adjacent to the frame touch electrode 326 upward or downward on the surface of paper. Further, the length L2 of a dummy slit 326e in the Y direction is shorter than, e.g. approximately ⅓ of, the length L1 of a slit 16b.

While the foregoing has described embodiments, the aforementioned embodiments are merely examples for carrying out the present disclosure. Accordingly, the present disclosure is not limited to the aforementioned embodiments but may be carried out with appropriate modifications to the aforementioned embodiments without departing from the scope of the present disclosure.

(1) Although the first to third embodiments have illustrated an example in which the pixel electrode is formed at a lower layer than the touch electrode, this is not intended to limit the present disclosure. For example, the pixel electrode may be formed at a higher layer than the touch electrode.

(2) Although the first to third embodiments have illustrated an example in which the frame touch electrode is formed at the same layer and of the same material (second transparent oxide) as the touch electrode, this is not intended to limit the present disclosure. For example, the frame touch electrode may be constituted by a laminated film of a first transparent oxide for use in the pixel electrode and a second transparent oxide for use in the touch electrode. Alternatively, the frame touch electrode may be constituted by not a transparent conductive film but a metal thin film or a laminated film including a metal thin film.

(3) Although the first to third embodiments have illustrated an example in which the touch electrode wire is formed at the same layer as the data lines, this is not intended to limit the present disclosure. For example, the touch electrode wire may be made of a material that is different from that of which the data lines are made. In this case, the touch electrode wire and the data lines may be disposed parallel to each other so as not to overlap each other in plan view, or may be stacked via an insulating film.

Figure 12:
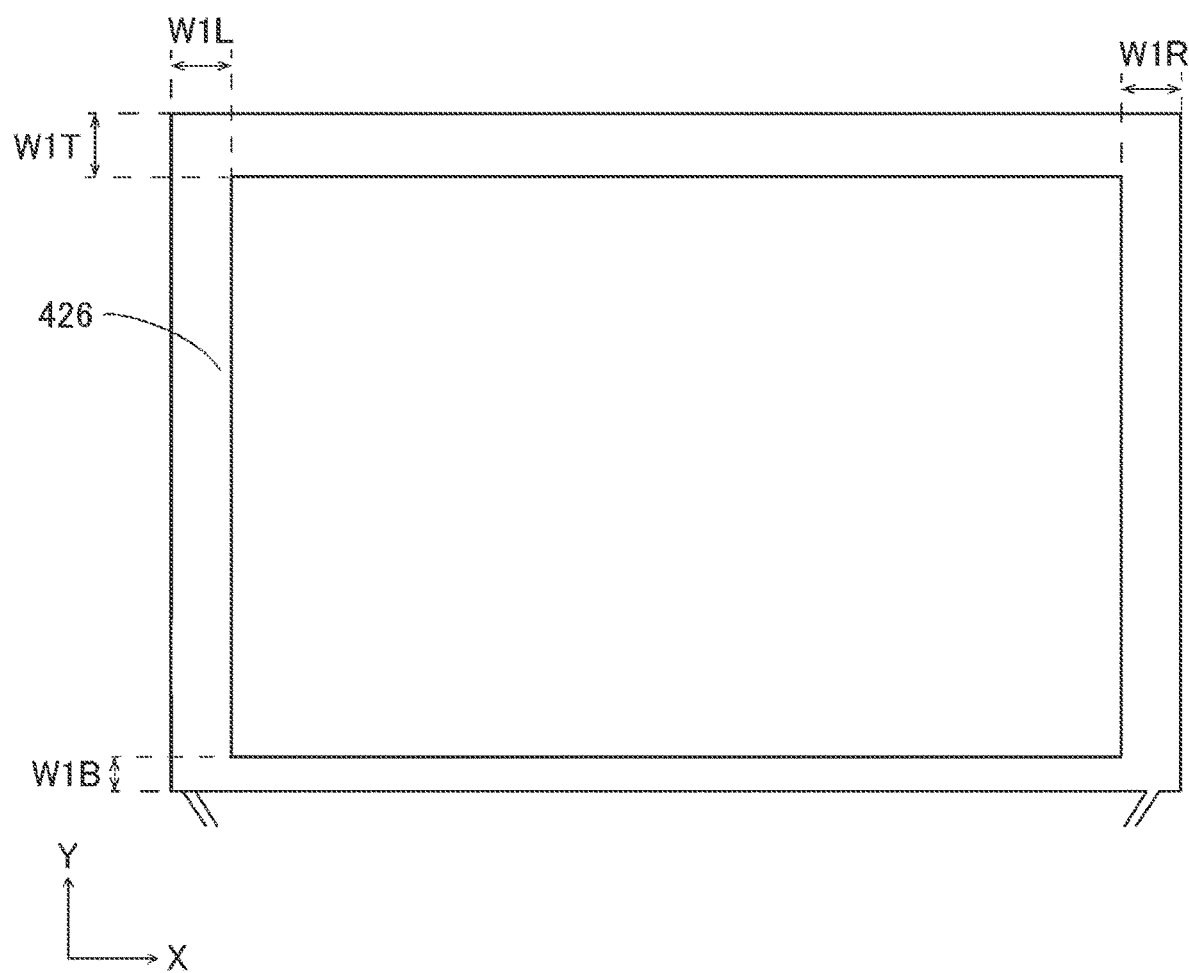
FIG. 12 is a schematic plan view for explaining a configuration of a frame touch electrode according to a modification of the first to third embodiments.

(4) Although the first to third embodiments have illustrated an example in which the frame touch electrode is disposed to surround the pixel region, this is not intended to limit the present disclosure. For example, the frame touch electrode may be partially disposed only for a side of the pixel region at which a touch operation tends to become unstable. That is, the line width W1 (see FIG. 4) of the frame touch electrode may not stay the same around the pixel region. For example, the line width of the frame touch electrode may be increased at an end (side) of the pixel region at which touch sensitivity tends to become unstable. Note here that an uniform increase in the line width of the frame touch electrode may lead to an increase in size of the frame of the display panel. Further, because the frame touch electrode comes to intersect the scanning lines and the data lines at more intersections, unintended defects will result. The inventor found by experiment that in the case of a rectangular pixel region, touch sensitivity is stable at a side (lower side) at which terminals are present and touch sensitivity tends to become unstable at sides (right and left sides) oriented to intersecting the side at which the terminals are present and a side (upper side) that is far away from the terminals. Accordingly, as in the case of a frame touch electrode 426 according to a modification shown in FIG. 12, the frame touch electrode 426 may be configured, for example, to have a relationship of Formula (1), where W1B is the line width of a portion of the frame touch electrode 426 disposed at a side (lower side; negative side of the Y axis) where terminals are present, W1T is the line width of a portion of the frame touch electrode 426 disposed at a side (upper side: positive side of the Y axis) that is far away from the terminals across the pixel region, and W1L and W1R are the line widths of the frame touch electrode 426 disposed at left and right sides, respectively, oriented to intersecting the side at which the terminals are present. Further, the frame touch electrode 426 may be configured to have a relationship of Formula (2) or (3) as well as Formula (1).

$$W1B < W1L = W1R < W1T \quad (1)$$

$$W1B < W1L = W1R = W1T \quad (2)$$

$$W1B = W1L = W1R < W1T \quad (3)$$

Although Formulas (1) to (3) assume that the line width W1L of a portion of the frame touch electrode 426 disposed at the left side and the line width W1R of a portion of the frame touch electrode 426 disposed at the right side are identical to each other, this is not intended to impose any limitation. The frame touch electrode 426 may be configured such that the foregoing magnitude relationship is satisfied and the line width W1L of the portion disposed at the left side and the line width W1R of the portion disposed at the right side are different from each other.

(5) Although the first to third embodiments have illustrated an example in which the frame touch electrode wire is made of the same material as the frame touch electrode or constituted by the second metal thin film (thin film of low-resistivity metal), this is not intended to limit the present disclosure. For example, the frame touch electrode wire may be formed of a metal thin film different from the thin film of low-resistivity metal. Further, a dummy data wire may be formed under the frame touch electrode, and the dummy data wire may be used as a frame touch electrode wire.

(6) Although the first to third embodiments have illustrated an example in which each touch electrode is provided with one touch electrode wire, this is not intended to limit the present disclosure. For example, one touch electrode may be provided with a plurality of touch electrode wires. Further, it is possible to, instead of providing each touch electrode with the same number of touch electrode wires, provide a touch electrode needing a longer touch electrode wire with a larger number of touch electrode wires. Although the dummy common electrode voltage and the scan signal for detecting dummy touch detection are supplied to the frame touch electrode via the touch electrode wire in a time-sharing manner, this is not intended to impose any limitation. For example, the dummy common electrode voltage may be supplied to the frame touch electrode at all times for the purpose of uniformity in parasitic capacitance around the touch electrode, although only a limited contribution is made to stabilization of touch detection.

(7) Although the first to third embodiments have illustrated an example in which an end of the touch electrode is disposed near the boundary between the pixel region and the frame region, this is not intended to limit the present disclosure. The touch electrode may extend slightly outward beyond the boundary between the pixel region and the frame region. In this case, even within the frame region, the frame touch electrode is not able to be disposed in a region where the touch electrode is present; therefore, the first dummy region extends from an end of the pixel region or an end of the touch electrode located beside an outer edge to one of the contours of the frame touch electrode that is far away from the pixel region.

(8) Although the first to third embodiments have illustrated an example in which as an example of a frame element, a dummy array segment including at least either a dummy switching element or a dummy pixel electrode is provided in the second dummy region, this is not intended to limit the present disclosure. For example, the frame element may be constituted by a structure in which one scanning line and another scanning line are connected to each other by a diode or a serpentine resistive element or a structure in which one data line and another data line are connected to each other by a diode or a serpentine resistive element. Alternatively, the frame element may be constituted by connecting it to a wire of a common electrode and/or a dummy scanning or data line connected to a ground wire, and such a dummy line may be constituted as a static electricity receiver (i.e. a structure that receives static electricity instead of an in-pixel structure).

(9) Although the first to third embodiments have illustrated an example in which the dummy array segment is provided as a measure of improvement in yield of the active matrix substrate, this is not intended to limit the present disclosure. For improvement in yield, wires or electrodes may be disposed to surround the pixel region. Further, for example, a pattern for identifying the row-wise positions/column-wise positions of wires or pixels may be disposed as management means for improving yields. For example, symbols such as alphanumeric characters may be provided by patterning either a semiconductor layer, a metal thin film, and a transparent electrode or an insulating film in a region overlapping the frame touch electrode in plan view. Since these symbols are electrically floating, they pose no problems with driving even if short-circuited with the frame touch electrode. Further, there is an advantage in that there is no need for a region in which to dispose the symbols and the frame is not enlarged.

(10) Although the first to third embodiments have illustrated an example in which in the first dummy region, the frame touch electrode and part of the dummy array segment overlap each other, this is not intended to limit the present disclosure. That is, in the first dummy region, the frame touch electrode and part of the dummy array segment may not overlap each other.

The aforementioned display device can also be described in the following manner.

An active matrix substrate according to a first configuration is an active matrix substrate including: a plurality of scanning lines; a plurality of data lines disposed to intersect the plurality of scanning lines; a plurality of switching elements disposed separately in each of a plurality of pixels demarcated by the plurality of scanning lines and the plurality of data lines; and a plurality of pixel electrode connected to the switching elements, wherein the active matrix substrate has, in plan view, a pixel region where the plurality of pixel electrodes are provided and a frame region surrounding the pixel region, the active matrix substrate further includes a touch electrode disposed to face the plurality of pixel electrodes in the pixel region, a frame touch electrode formed at a first layer in the frame region and not electrically connected to the touch electrode, and a frame element, formed at a second layer different from the first layer in the frame region, that suppresses an electrostatic discharge failure of at least one of the plurality of pixels, and the frame region includes a first region, provided in a position adjacent to the pixel region, where the frame touch electrode is disposed, and a second region, provided in a position opposite to the pixel region across the first region, where the frame touch electrode is not disposed but the frame element is disposed (first configuration).

The first configuration makes it possible to effectively detect a touch at an end of the pixel region beside the frame region, as the frame touch electrode is provided in the frame region. Further, the occurrence of a defect in a structure in a pixel in the pixel region due to static electricity can be restrained, as the frame element that suppresses an electrostatic discharge failure of a pixel is disposed in the frame region. Moreover, the frame touch electrode and the frame element can be better restrained from being short-circuited with each other than in a case where the frame touch electrode is formed in both the first region and the second region, as the frame touch electrode is not disposed in the second region of the frame region.

In the first configuration, the frame element may include at least either a dummy switching element formed of a material that is identical to that of which the plurality of switching elements are formed and formed at a layer that is identical to that at which the plurality of switching elements are formed or a dummy pixel electrode formed of a material that is identical to that of which the plurality of pixel electrodes are formed and formed at a layer that is identical to that at which the plurality of pixel electrodes are formed (second configuration).

According to the second configuration, in a case where the frame element includes the dummy switching element, the destruction of a switching element by entry of static electricity from around the active matrix substrate can be inhibited by the dummy switching element during execution of the step of manufacturing the plurality of switching elements. Further, in a case where the frame element includes the dummy pixel electrode, the destruction of a pixel electrode by entry of static electricity from around the active matrix substrate can be inhibited by the dummy pixel electrode during execution of the step of manufacturing the plurality of pixel electrodes.

In the first or second configuration, in the first region, at least part of the frame touch electrode may be disposed to overlap part of the frame element in plan view (third configuration).

The third configuration makes it possible to reduce the size of the frame region to the extent that the at least part of the frame touch electrode and the part of the frame element overlap each other in the first region.

In any one of the first to third configurations, the frame touch electrode may be formed to surround the pixel region in plan view (fourth configuration).

The fourth configuration makes it possible to improve the touch sensitivity of the whole edge portion of the pixel region.

In any one of the first to fourth configurations, an end side of the touch electrode beside the first region may include a bend curved in plan view, and an end side of the frame touch electrode beside the pixel region may include, in a position opposite to the bend, a portion having a shape taken along the bend (fifth configuration).

The fifth configuration makes it possible to reduce the spacing between the frame touch electrode and the touch electrode, as the end side of the frame touch electrode beside the pixel region has a shape taken along the bend of the touch electrode.

In any one of the first to fifth configurations, the touch electrode may include a plurality of slits, and the frame touch electrode may have a hole or notch formed in a portion of the frame touch electrode beside the pixel region (sixth configuration).

Note here that in the semiconductor formation process, an intended shape or intended dimensions may not be attained in a place where the density of electrodes rapidly changes. On the other hand, the sixth configuration, in which a hole or a notch is formed in a portion of the frame touch electrode beside the pixel region, makes it possible to make the density of portions of the frame touch electrode beside the pixel region close in magnitude to the density of touch electrodes provided with slits. As a result of this, the density of electrodes does not rapidly change between the touch electrode and the frame touch electrode. This makes it possible to restrain the touch electrode from not having an intended shape or not having intended dimensions.

In the sixth configuration, the hole or the notch of the frame touch electrode may be identical in shape in plan view to at least one of the plurality of slits (seventh configuration).

The seventh configuration makes it possible to make the density of portions of the frame touch electrode beside the pixel region identical to the density of the touch electrode in which the slits are provided.

A display panel according to an eighth configuration includes the active matrix substrate of any one of the first to seventh configurations and a counter substrate disposed to face the active matrix substrate (eight configuration).

The eighth configuration makes it possible to provide a display panel capable of effectively detecting a touch at an end of a pixel region beside a frame region and capable of, while reducing the percent defective of structures in pixels in the pixel region, restraining a short circuit from occurring in the frame region.

A display device according to a ninth configuration includes the display panel of the eighth configuration and a control circuit that controls the display panel (ninth configuration).

The ninth configuration makes it possible to provide a display device capable of effectively detecting a touch at an end of a pixel region beside a frame region and capable of, while reducing the percent defective of structures in pixels in the pixel region, restraining a short circuit from occurring in the frame region.

The present disclosure contains subject matter related to that disclosed in Japanese Priority Patent Application JP 2021-175058 filed in the Japan Patent Office on Oct. 26, 2021, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An active matrix substrate comprising:
   a plurality of scanning lines;
   a plurality of data lines disposed to intersect the plurality of scanning lines;
   a plurality of thin-film transistors disposed separately in each of a plurality of pixels demarcated by the plurality of scanning lines and the plurality of data lines; and
   a plurality of pixel electrodes connected to the plurality of thin-film transistors,
   wherein
   the active matrix substrate has, in a plan view, a pixel region where the plurality of pixel electrodes is provided and a frame region surrounding the pixel region,
   the active matrix substrate further comprises:
      a touch electrode disposed to face the plurality of pixel electrodes in the pixel region,
      a frame touch electrode formed at a first layer in the frame region and not electrically connected to the touch electrode, and
      a semiconductor, formed at a second layer different from the first layer in the frame region, that intersects at least one of the plurality of scanning lines connecting at least one of the plurality of pixels, or that intersects a gate electrode branching off from the at least one of the plurality of scanning lines, and
   the frame region comprises:
      a first region, provided in a position adjacent to the pixel region, where the frame touch electrode is disposed, and
      a second region, provided in a position opposite to the pixel region across the first region, where the frame touch electrode is not disposed but the semiconductor is disposed.

2. The active matrix substrate according to claim 1, wherein the semiconductor includes at least one of a dummy thin-film transistor formed of a material that is identical to a material of which the plurality of thin-film transistors is formed and formed at a layer that is identical to a layer at which the plurality of thin-film transistors is formed and a dummy pixel electrode formed of a material that is identical to a material of which the plurality of pixel electrodes is formed and formed at a layer that is identical to a layer at which the plurality of pixel electrodes is formed.

3. The active matrix substrate according to claim 1, wherein in the first region, at least a part of the frame touch electrode overlaps a part of the semiconductor in the plan view.

4. The active matrix substrate according to claim 1, wherein the frame touch electrode surrounds the pixel region in the plan view.

5. The active matrix substrate according to claim 1, wherein
   an end side of the touch electrode adjacent the first region includes a bend curved in the plan view, and
   an end side of the frame touch electrode adjacent the pixel region includes, in a position opposite to the bend, a portion having a shape taken along the bend.

6. The active matrix substrate according to claim 1, wherein
   the touch electrode includes a plurality of slits, and
   the frame touch electrode has a hole or a notch formed in a portion of the frame touch electrode adjacent the pixel region.

7. The active matrix substrate according to claim 6, wherein the hole or the notch is identical in shape, in the plan view, to at least one of the plurality of slits.

8. A display panel comprising:
   the active matrix substrate according to claim 1; and
   a counter substrate disposed to face the active matrix substrate.

9. A display device comprising:
   the display panel according to claim 8; and
   a control circuit that controls the display panel.

10. The active matrix substrate according to claim 1, wherein an end side of the frame touch electrode adjacent the pixel region is positioned between the pixel region and the semiconductor in the frame region.

11. The active matrix substrate according to claim 1, wherein the frame touch electrode includes a projecting portion projecting toward the pixel region.

* * * * *